June 17, 1930.  D. I. FOGGER  1,765,066
COMBINED AXLE AND FRAMING STRUCTURE
Filed March 12, 1928
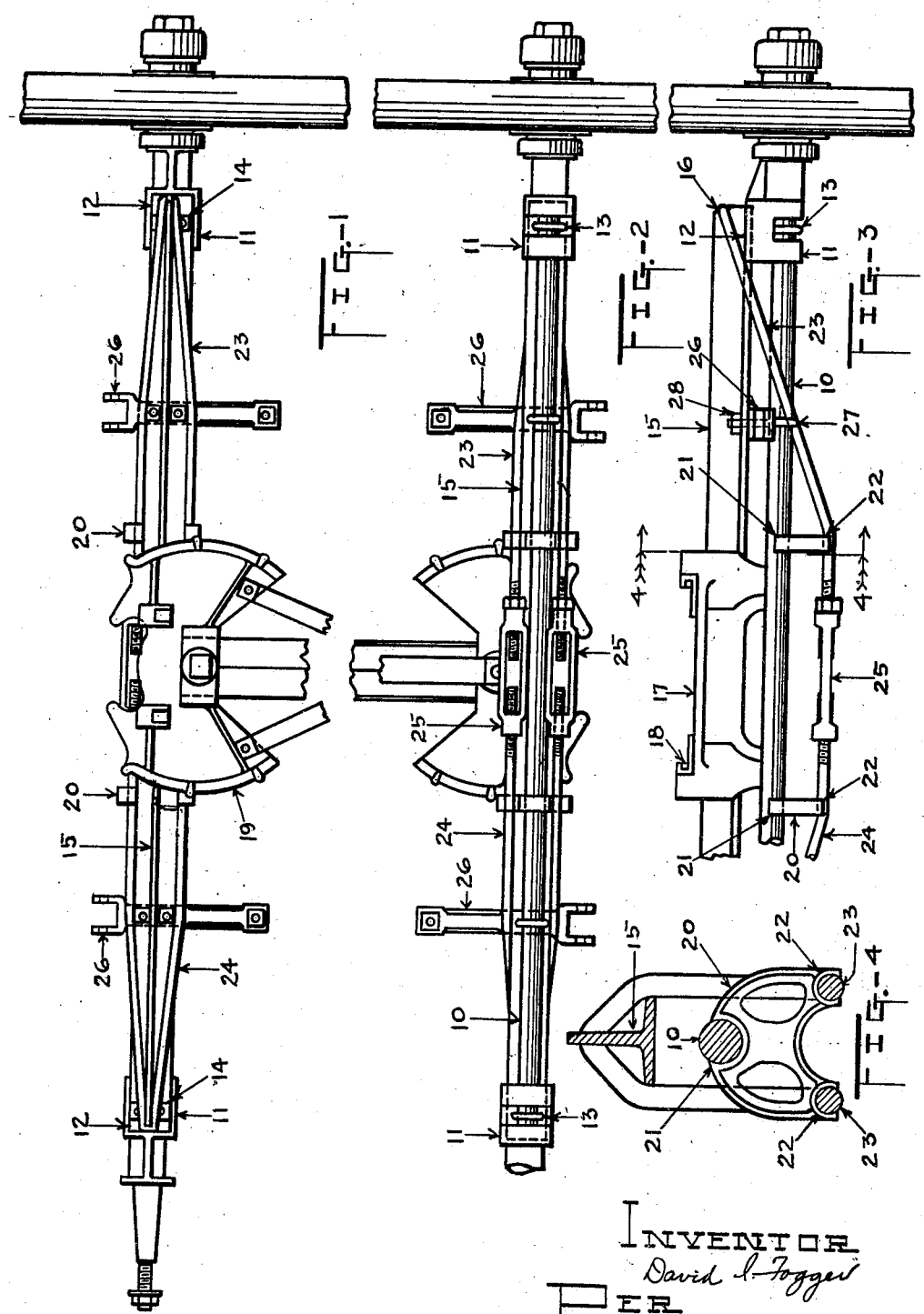
INVENTOR
David I. Fogger
PER
Tefft and Tefft
ATTORNEYS Patented June 17, 1930

1,765,066

UNITED STATES PATENT OFFICE

DAVID I. FOGGER, OF PERU, ILLINOIS, ASSIGNOR TO PERU PLOW & WHEEL CO., OF PERU, ILLINOIS, A CORPORATION OF ILLINOIS

COMBINED AXLE AND FRAMING STRUCTURE

Application filed March 12, 1928. Serial No. 260,961.

This invention relates to a unit structure including an axle and framing member, and has special reference to a unit structure of the nature indicated used in trailers, light draft wagons and the like.

The present application is a division based on subject matter contained in applicant's pending application, Serial No. 188,149, filed May 2, 1927.

The invention has special reference to simplicity of coordinated parts and to the manner of assembling same to produce an integrated unit possessing mutuality of reinforcement and also producing a structure that provides for substantially uniform distribution of carrying quality or function throughout the unit structure.

Referring to the drawings—

Fig. 1 is a plan view of the invention shown in the wheel axle assembly;

Fig. 2 is a bottom view disclosure of the same subject-matter as shown in Fig. 1;

Fig. 3 is a front elevation, in part, of the disclosure in Figs. 1 and 2; and

Fig. 4 is a cross-sectional view on the line 4—4 of Fig. 3.

Applicant has knowledge of the fact that unit structures, including framing and axle members have heretofore been used, particularly in conjunction with passenger automobiles and generally in conjunction with horse and motor drawn vehicles, that included certain specific relative reinforcing characteristics. However, the differentiation from such art mentioned that constitutes the invention here grew out of the necessity for the development of a unit axle structure of a maximum strength and integrity in connection with its principal use, which is with a motor-drawn trailer. These hard rubber wheeled trailers are drawn at a righ rate of speed over concrete and other hard surfaced road beds with attendant tremendous jar and vibration that would be destructive of any ordinary unit axle assemblage, and hence the necessity of that herewith presented that has proven thoroughly serviceable under the severest tests.

In the drawings, 10 is an axle bar provided with skein and wheel attachment, as shown. 11 are cast block members in association with the skein. 12 are depressions or seats in the top faces of the block members. 13 is a yoke adapted to join the block members 11 to axle bar 10, which attachment means also includes nuts as 14 for connection with the threaded free ends of said yokes. 15 is an angle bar comprising a broad faced horizontally disposed portion and a vertically ribbed portion of substantial height. 16 are seats or angular offsets in the vertical ribbed portions of the angle bar adapted for seating stress rods. 17 refers generally to a cast block member adapted for seating and joining relation respectively in conjunction with axle bar 10 and angle bar 15, the general relation between the members indicated being probably best shown in Fig. 4.

Block member 17 is generally fashioned to overlie or straddle the vertical flanged portion of angle bar 15, and for seating relation upon the lateral flanges of said bar. A seat as 18 is provided in the upper portion of block member 17 to facilitate reception for seating of fifth wheel 19.

Seating plate members 20 constitute an integral part of block 17 and are relatively spaced, as shown, at opposite ends of the main casting and are provided with axle bar seats 21 at their upper central marginal portion and with relatively spaced stress rod seats 22 at their bottom edges.

23 and 24 are relatively opposed stress rod loops engaging respectively with opposed ends of the vertical ribbed portion of angle bar 15, and 25 are turn buckles connecting threaded ends of said stress rod loops. The stress rods are adapted, when applied in the manner shown in the drawings, and when properly tensioned through service of the turn buckles, to effect a stressed union between the axle bar, angle bar and the cast block member. The stressed relation between the wheel and axle bar members may be regulated at will and any lost motion developed in connection with the use of the units may readily be taken up by means of the turn buckles.

26 are merely attachment plates to facilitate connection of cross rod and draft members, the same being joined to the axle bar 10 and angle bar 15 by means of the U-loops as 27, nuts 28 and the proper entry of the U-loop ends through perforations in lateral flanges of the angle bar 15.

It will be noted from the above description that the parts which constitute the unit structure including framing and axle, are of the simplest form and character which results in a lessening of the cost. Also, it will be noted that a union is effected between parts which are generally dependent only upon stress rods to maintain integrity of assembly, as distinguished from a multiplicity of bolts, nuts and the like, and furthermore, it will be noted that because of the union effected through the stress rods, supporting stress or strain resulting from load is automatically so distributed that each part of the structure functions to carry its proper proportion of the load.

Applicant has shown herein the preferred form of embodiment of the invention. However, its extension with respect to details of structure and method of joining to constitute an integrated unit, to any and all equivalents of structure that come legitimately within the spirit of the invention, is contemplated to be included in the appended claims.

What I claim is:

1. An axle assembly comprising an axle, a T-bar mounted on the axle at a spaced distance therefrom, means for trussing the axle comprising opposed truss rods having their intermediate portions bent about the outer ends of the T-bar, the ends of each of said truss rods projecting downwardly and towards the other truss rod to a point below the axle, means attached to the axle for holding the ends of each truss rod at a spaced distance apart and below the axle, and adjustable members connecting the adjacent ends of the truss rods.

2. An axle assembly comprising an axle, an angle bar mounted on the axle, means for spacing said members and for support of the angle bar comprising a block connecting the axle and angle bar, opposed truss rods passing around the ends of the angle bar and extending downwardly to a point below the axle, means for holding the ends of each truss rod apart and below the axle comprising members attached to the axle and having indentations through which the truss rods pass, and turn buckle members connecting the adjacent ends of the truss rods.

3. An axle assembly including an axle, a T-bar mounted on the axle at a spaced distance therefrom, means for trussing the axle with respect to the T-bar member comprising opposed truss rods bent at points intermediate their length around the opposite ends of the T-bar, said truss rods passing downwardly from the T-bar and towards each other to a point below the axle, members attached to and extending downward and outward from the axle, said members having indentations through which the truss rods pass, and turn buckle members connecting the adjacent ends of the truss rods.

In testimony whereof I have hereunto affixed my signature.

DAVID I. FOGGER.